C. D. RYDER.
FENDER BRACKET FOR AUTOMOBILE LAMPS.
APPLICATION FILED JUNE 29, 1918.
1,314,704.
Patented Sept. 2, 1919.
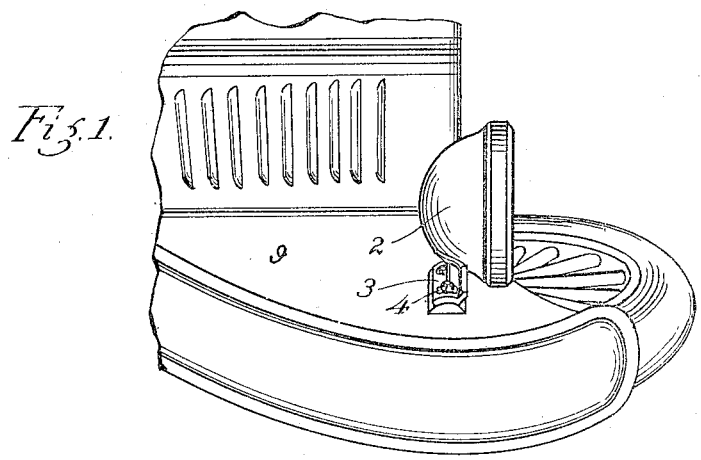
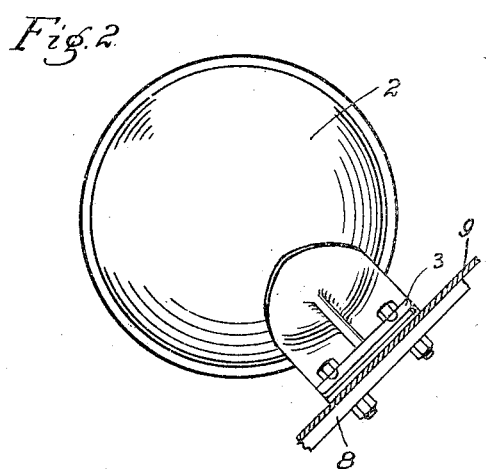
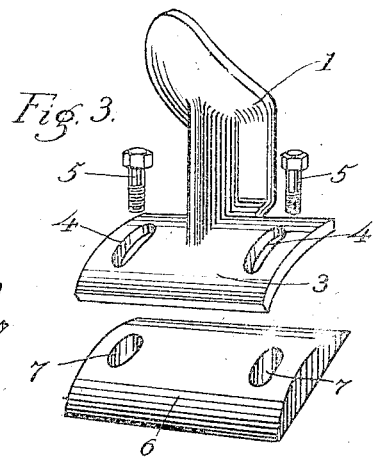
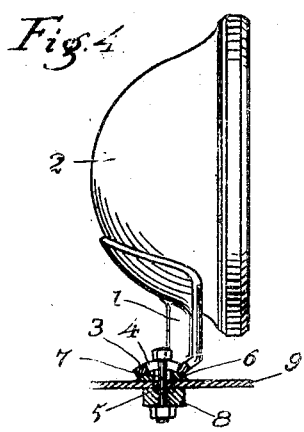
Inventor.
Charles D. Ryder
By Allen & Allen
Attorneys.

UNITED STATES PATENT OFFICE.

CHARLES D. RYDER, OF COVINGTON, KENTUCKY, ASSIGNOR TO CORCORAN-VICTOR COMPANY, OF CINCINNATI, OHIO, A CORPORATION OF OHIO.

FENDER-BRACKET FOR AUTOMOBILE-LAMPS.

1,314,704.     Specification of Letters Patent.     Patented Sept. 2, 1919.

Application filed June 29, 1918. Serial No. 242,531.

*To all whom it may concern:*

Be it known that I, CHARLES D. RYDER, a citizen of the United States, and a resident of Covington, in the county of Kenton and State of Kentucky, have invented certain new and useful Improvements in Fender-Brackets for Automobile-Lamps, of which the following is a full, clear, and exact description, reference being had to the accompanying drawing, forming part of this specification.

Automobile headlights are usually mounted in a forked bracket, between the forks of which the lamp casing is secured so as to permit up and down adjustment for the light, while the forked bracket itself has been arranged to turn on a vertical pivot, to adapt the two lamps for lateral adjustment.

It has also been customary to mount such forked brackets on the front fender between the hood and the inclined fender wall, using in that connection frequently the same bolts for attaching the lamp bracket that are employed for securing the fender to the supporting brace for the fender. In such constructions, however, unless the forked bracket is employed, no provision has been made for the vertical and lateral adjustments.

It is the object of my invention, therefore, to provide a bracket construction for such lamps which shall comprise a minimum number of parts, shall be cheap and effective and with which both adjustments, vertical and lateral, may be readily and easily obtained.

In the drawing,

Figure 1 is a perspective view of a portion of the hood and front fender of an automobile showing my improved construction.

Fig. 2 is an end elevation of the bracket and lamp, showing the fender in section.

Fig. 3 is a perspective view of the parts of the bracket.

Fig. 4 is a side elevation of the bracket and lamp, with the fender in section.

The bracket comprises a main body portion 1, the upper part being made concave to receive and hold the back casing of the lamp 2 secured thereon. The base 3 of the bracket is segmental in shape, and is provided with a pair of slots 4, 4, transverse the base plate for the passage of the retaining bolts 5, 5, and the plate is mounted on a segmental block 6 also provided with slots 7, 7, for the retaining bolts. This segmental block rests on the fender and the retaining bolts lock the parts rigidly together and pass through the supporting brace 8 for the fender 9.

For lateral or vertical adjustment of the lights, the nuts are loosened and the bracket can then be shifted either by rocking the segmental bracket on the segmental block or the block and plate together can be twisted on the fender within the limits of the slots in the block, or both adjustments can be made at the same time. Practically a universal joint is thus obtained for the bracket, due to the fact that the block and plate are segmental so that the parts can be twisted.

While the construction above described is specially designed for attachment to the automobile fenders, the novelty resides in the bracket construction, and it is not desired to limit the invention to the use as a fender bracket, as it might be applicable for securing the lamps to other portions of the automobile.

Having thus described my invention, what I claim as new and desire to secure by Letters Patent, is:—

1. In an automobile bracket for mounting a lamp on a desired surface, the combination with the bracket body provided with a segmental base plate, of a segmental surfaced block upon which the bracket is mounted having its lower surface to conform with the surface on which it is to be mounted, with transverse slots in the plate and block registering with each other, and bolts for securing the parts in position on the car.

2. In an automobile lamp bracket, the combination with the fender and supporting brace therefor, of a bracket body provided with a segmental base plate, and a segmental block to fit the segmental base, the under surface of the block being flat to engage the fender, the plate and block formed with transverse registering slots, and bolts for securing the parts to the fender brace.

CHARLES D. RYDER.